(12) United States Patent
Schulz et al.

(10) Patent No.: US 6,224,838 B1
(45) Date of Patent: May 1, 2001

(54) SCALLOP DESIGN FOR RADIAL FLOW REACTOR INTERNALS

(75) Inventors: Gary A. Schulz, Mt. Prospect; Jeffrey E. Burgard, Lombard, both of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/326,993

(22) Filed: Jun. 7, 1999

(51) Int. Cl.⁷ .................................................. B01J 8/02
(52) U.S. Cl. ........................ 422/218; 422/191; 422/216; 422/219; 422/221
(58) Field of Search .................................. 422/218, 219, 422/216, 191, 221, 181

(56) References Cited

U.S. PATENT DOCUMENTS

| | | | |
|---|---|---|---|
| 4,110,081 | * 8/1978 | Millar et al. | 422/216 |
| 4,167,553 | * 9/1979 | Persico et al. | 422/216 |
| 5,366,704 | 11/1994 | Koves et al. | 422/218 |

* cited by examiner

*Primary Examiner*—Hien Tran
(74) *Attorney, Agent, or Firm*—John G. Tolomei; Frank S. Molinaro; Benjamin C. Spehlmann (57) ABSTRACT

Conduits for a radial flow reactor to provide fluid/solid contacting are improved structurally in terms of possessing good flexibility and a high resistance to vertical buckling when subjected to radially and axially directed stresses. The desired conduit characteristics are obtained using connection flaps to flexibly join a curved profile wire front side to a flatter back side that is proximate to the reactor vessel wall. The rigid profile wire section is maintained at some distance from the vessel wall so that the conduit can flex without permanent damage in an environment where stresses are imparted due to either temperature or thermal expansion differences within the reactor environment. The radial flow reactor of this invention is especially suited for processes such as catalytic reforming where thermally-induced stresses result from both transient and discontinuous operation.

11 Claims, 6 Drawing Sheets

SCALLOP DESIGN FOR RADIAL FLOW REACTOR INTERNALS

FIELD OF THE INVENTION

This invention relates generally to the contacting of fluids and particulate materials. Specifically, this invention relates to the internals of reactors used in the contact of fluids and solid particles. More specifically, this invention relates to the design of conduits for the radial distribution or collection of gases in fluid particle contacting.

BACKGROUND OF THE INVENTION

Numerous processes use radial flow reactors to effect the contacting of particulate matter with a gaseous stream. These processes include hydrocarbon conversion, adsorption, and exhaust gas treatment. These reactors contain a vertically extending annular bed of particles through which the gases flow radially in an inward or outward direction. The annular bed is formed by an outer screen element located along the outer diameter of the particle bed and an inner screen element located along the inner diameter of the particle bed. The outer screen element often consists of a series of closed conduits having an oblong cross-section that circles the outside of the particle bed and borders the inside of the particle containing vessel. The outer screen element can also be provided by a cylindrical screen or basket structure that retains particles in its interior and provides a gas distribution space about its exterior. This invention does not apply to such cylindrical screen or basket arrangements. One familiar geometry for the oblong conduits has a scallop shaped cross-section and such conduits are hereinafter referred to as scallops. Scallops are preferred in many applications due to lower cost and simplicity of design compared to many continuous screen designs. The conduits have the oblong or scallop shape so that the backs of the conduits will fit closely against the wall of the vessel thereby minimizing the volume between the back of the conduit and the vessel and maximizing the central bed volume of the vessel.

A common type of scallop design now used in radial flow reactors is described in U.S. Pat. No. 5,366,704. This disclosure is directed toward a scallop fabricated from a single sheet of material that is rolled to the desired shape and welded along a joint that extends vertically when the scallop is oriented in its normal position within the radial flow reactor. The scallop is perforated to allow contact of generally radially flowing gas with catalyst particles contained within an annular catalyst retention space. One very desirable feature of this design, commonly referred to as a "perforated plate" or "punched plate" scallop, is its ability to undergo significant radial stresses associated with differences in thermal expansion coefficients between the scallop and the catalyst particles, reactor wall, and other reactor internal structures. Thermal expansion is a major consideration because radial flow reactors are overwhelmingly used in processes (e.g. catalytic reforming) requiring elevated temperatures. During transient processing conditions (e.g. startup, shutdown, and plant upsets), perforated plate scallops can generally yield to thermal radially directed stresses and distort from their original shape without a material change in performance. Without this flexibility, other internal reactor structures or even the catalyst particles may become significantly damaged.

Radial stresses imparted on the scallops also result from intermittent heating and cooling of the radial flow reactor when, for example, operation is non-continuous. When the reactor is heated for normal operation, it expands in both the axial and radial directions. Radial expansion permits an increased cross sectional area within the reactor vessel for catalyst particles comprising a catalyst bed to fill by gravity. When the reactor is later cooled for suspension of operation, the catalyst bed becomes compressed and thereby exerts a radially directed force on the scallops. Generally, catalyst particles have a considerably lower thermal expansion coefficient than reactor components and therefore change very little in dimension upon heating.

As is also understood in the art, particularly that pertaining to catalytic reforming using radial flow reactors, perforated plate scallops often lack the required rigidity in the longitudinal direction. As a result, these types of scallops have a tendency to collapse or buckle vertically under the combined radial and axial stress loadings exerted in normal operation. Axial stress, like radial stress, also stems mainly from thermal expansion, resulting in frictional resistance between the vertically "growing" scallop and catalyst particles in contact with the scallop outer face. The buckling phenomenon is perhaps best clarified using the example of a common, empty aluminum beverage can. A typical such container can support a significant load (e.g. the weight of an average person) in the axial direction. Nevertheless, when even a small radial force is applied to the side of the can (e.g. gentle pressure from a finger) in conjunction with this vertically directed stress, the can is easily crushed.

In the case of perforated plate scallops, as is recognized in the art, improving this buckling resistance is unfortunately not simply a matter of using a thicker metal sheet in fabrication. This is because, as the metal sheet thickness increases, the structural demands of so-called "punch and die" fabrication equipment capable of withstanding the scallop manufacturing process become prohibitive. Additionally, the necessary slotted perforations may become obstructed from migration of metal displaced during punching of the slots to adjacent slot areas. As a practical constraint, therefore, the thickness of the sheet metal used for perforated plate scallops cannot be greater than that of the slot openings. In turn, the slot width, to ensure the segregation of gaseous reactants and catalyst at the scallop interface, is governed by the minimum catalyst particle size, which is generally about 1.2 mm. Therefore, the use of 18-gage metal represents a practical maximum of metal thickness for scallop fabrication.

More recently, the problem of improving scallop axial strength to overcome buckling failure has been addressed using a curved section of profile wire to comprise a perforated scallop front side, joined to a flatter metal back side. Profile wire for this application is normally in a form known in the industry as a Johnson Screen (available from U.S. Filter Company, St. Paul, Minn.) or as a profile wire screen available from other suppliers worldwide. Profile wire screen provides a highly regular slotted surface that is resistant to blockage (plugging) from extended contact of the outer face of the profile wire section with catalyst particles. Furthermore, the rigidity of the profile wire section, regardless of slot opening, can be tailored according to the spacing and thickness of support bars used to join each individual, parallel extending, profile wire. Normally, the support bars are welded to each profile wire at the inner face of the profile wire screen, that is, the face not in direct contact with the catalyst particles. Support bars and profile wire are generally affixed perpendicularly to each other.

These newer scallops, hereinafter referred to as "conventional profile wire scallops" have been used commercially with some success in terms of resisting buckling in the axial or vertical direction. However, the desired radial flexibility of these prior art designs has been found unacceptably compromised. In other words, axial stiffness has been achieved, but only at the expense of a corresponding and undesired increase in resistance to radial stresses. A potential problem with such a design is that the use of scallops comprising profile wire, due to their lack of radial flexibility, can provide a crushing force between the catalyst and the inner screen or central conduit. Because catalyst particles are present between the scallops and central conduit, and the catalyst is normally essentially non-compressible, the axial load can be easily transmitted to the central conduit. Ultimately, the central conduit may become crushed from such stress loadings, resulting in a potential loss of catalyst containment. In general, maintenance and repair costs associated with conduit damage are significant, especially in cases relating to catalytic reforming operations where several radial flow reactors are in a vertically stacked arrangement. In these situations, a damaged reactor internal structure may require the dismantling of several reactors. Furthermore, severe damage to downstream equipment is expected in cases where catalyst containment is lost, allowing catalyst particles to exit the reactor with the outlet gas flow.

Overall, therefore, the prior art has failed to provide a scallop design that exhibits both adequate resistance to buckling in the presence of longitudinally directed stresses combined with good flexibility in the presence of radially directed stresses.

SUMMARY OF THE INVENTION

The present invention provides a radial flow device comprising scallops that yield flexibly to radially directed stresses and resist buckling or collapse in the presence of axially directed stresses. These characteristics of the scallops thus provide an improved radial flow reactor suitable for numerous applications and especially for the catalytic reforming of hydrocarbons.

The back side of each of the novel scallops normally comprises a metal sheet and is curved to generally conform to the curvature of an inner wall of a vertically oriented and essentially cylindrical vessel. A connection flap extends in a continuous transition from each edge of the back side. These connection flaps provide good flexibility in the presence of radial stresses and also join each of two edges of a front side of each scallop. The front side comprises a curved section of profile wire positioned by support bars. As mentioned previously, the profile wire is sufficiently rigid in the axial direction so that the scallops are highly resistant to vertical buckling. The scallop design thus overcomes the previous problems associated with both collapse under combined axial and radial stresses and inadequate radial flexibility leading to the damage of catalyst and/or internal reactor structures.

Accordingly, in a broad embodiment the present invention is an improved scalloped shaped conduit for contacting particles and fluid in a circumferential arrangement of scallops about the interior of the vessel. A plurality of longitudinally extended profile wires define a first transverse radius of curvature of a front side of the conduit, and the profile wires are generally uniformly spaced about the circumference of the first radius. A plurality of transversely extending support bars rigidly retain the profile wires. The profile wires and support bars define a plurality of perforations over the front side and also define a pair of first longitudinally extended edges that are spaced apart across the width of, and extend the length of, the front side. An axially extended back side having a second transverse radius of curvature greater than the first radius defines a pair of second longitudinally extended edges that are spaced apart across the width of, and extend the length of, the back side. A connection flap projects in a generally normal direction from each of the pair of the second longitudinally extended edges to retain each of the pair of the first longitudinally extended edges and to space each of the pair of first longitudinally extended edges from the back side.

In another embodiment the present invention is an improved scallop for use in a radial flow device for contacting particles and fluid. The device includes a vertically extending vessel having a fluid inlet, a fluid outlet, a plurality of vertically extended outer conduits arranged circumferentially about the interior of the vessel, a perforated central conduit located in the center of the vessel, and a particle retaining space in the vessel. Each outer conduit has a transverse cross section defined by a first radius to provide a front side, a second radius larger than the first radius and defining a horizontally extended back side, and a pair of connection flaps extending generally toward the interior of the vessel. The front side comprises uniformly spaced profile wire extending generally vertically along the front side to define a plurality of perforations. The profile wire is rigidly affixed to a plurality of vertically spaced support bars extending generally horizontally across the front side. The back side of each conduit is located proximate the wall of the vessel. A connection flap extends from each of two vertical edges of the back side for flexibly joining, at a location offset from the back side, each of two vertical edges of the front side. Each outer conduit has at least one end communicating with one of the fluid inlet or fluid outlet. The perforated central conduit communicates with the other of the fluid inlet or fluid outlet not communicating with the outer conduits. A least one of the vessel, the central conduit, and the outer conduits defines the particle retaining space. The particle retaining space communicates with the plurality of perforations and the central conduit.

DETAILED DESCRIPTION OF THE INVENTION

This invention can be applied to any fluid-particle contacting apparatus or process that uses extended conduits, positioned within a containment vessel and adjacent to or against the wall of the vessel, for distributing or collecting fluid from a particle bed. The vessel can be a reactor or any type of contacting vessel and this invention is not limited to any specific type of process or vessel arrangement. This apparatus or process is useful in processes where transient temperature gradients or temperature fluctuations are imposed on the vessel internals, causing stresses on these internals and any catalyst particles used to effect a particular reaction. These stresses can impart both axial and radial forces on internal structures and catalyst and result from differences in thermal expansion and even steady-state operating temperatures among the materials within the reactor vessel.

The conduits may be arranged in the vessel to provide radial flow or cross flow through the bed of particles. There is also no limitation to the direction of flow produced by the conduits. Typically, however, the conduits are arranged circumferentially about the interior of the vessel and gas flow is outward from the conduits, across a catalyst retention space in a radial direction, and into a perforated central conduit located in the center of the vessel. In such an arrangement, the conduits communicate with the reactor inlet and the central conduit communicates with the reactor outlet.

Figure 1:
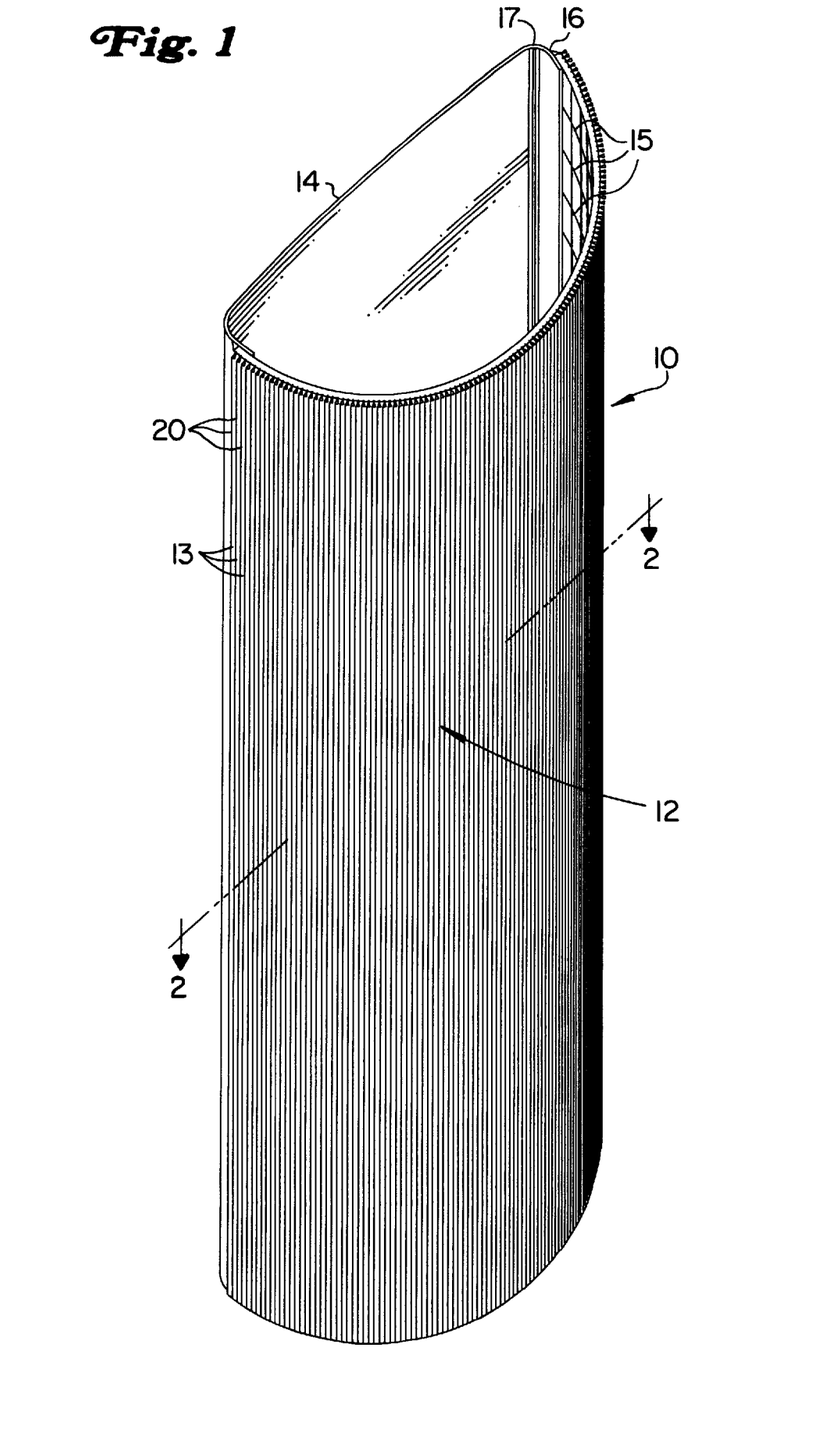
FIG. 1 is a view of a single, scallop-type, distribution/collection conduit.

The distribution/collection conduits, to which this invention may be applied, can have a variety of shapes. Conduits having rectangular, oblong, square or arcuate cross-sections can be used for fluid distribution or collection. One type of commonly used conduit, called a scallop, was previously mentioned. FIG. 1 shows a single vertically oriented scallop 10 comprising an axially extended front side or section 12 and an axially extended back side or section 14. A plurality of longitudinally extending and generally uniformly spaced profile wires 13 form a curved surface of the front side 12. A solid or perforated flatter sheet, preferably metal, forms the surface of the back side 14. A plurality of transversely extending support bars 15 rigidly retain the profile wires 13. The profile wires 13 and support bars 15 are affixed generally perpendicularly to one another using any suitable means known in the art, preferably welding. Furthermore, the profile wires 13 and support bars 15 define a plurality of perforations 20 over the front side 12.

Figure 2:
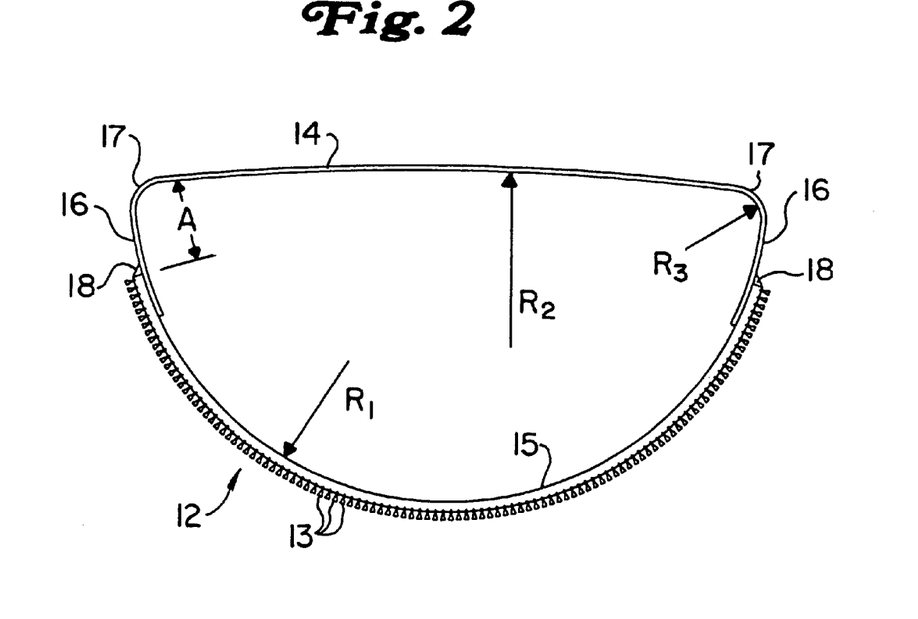
FIG. 2 is a cross-sectional view of the scallop of FIG. 1, taken at line 2—2.
Figure 3:
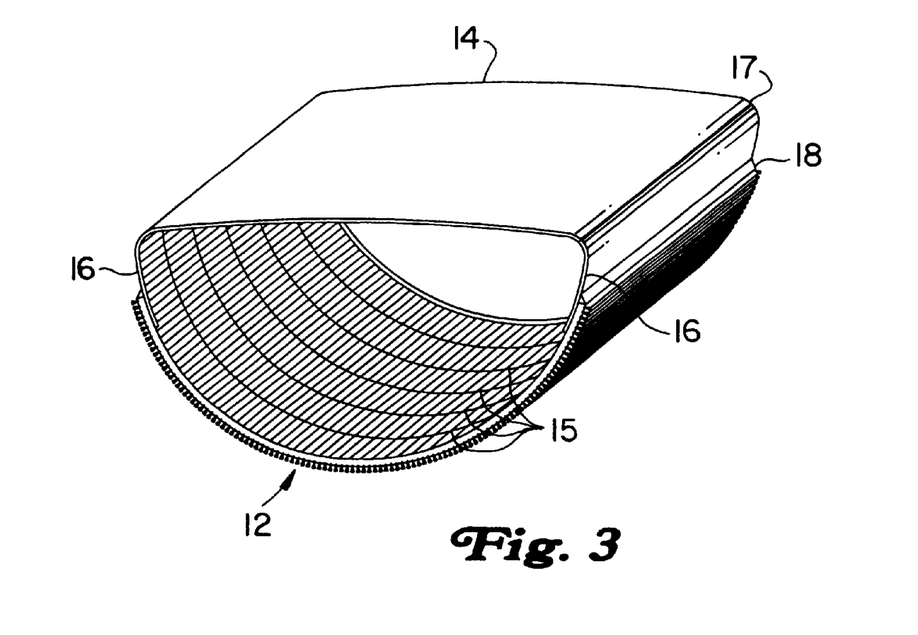
FIG. 3 is an isometric view of a portion of a scallop.

FIG. 2 shows the general cross-sectional shape of a scallop, where the front side 12 has a transverse radius of curvature $R_1$, defined by the plurality of profile wires 13 that are affixed to transversely extending support bars 15. The extended back side 14 has a transverse radius of curvature $R_2$ larger than the transverse radius of curvature $R_1$ of the front side 12. The profile wires and support bars define a pair of first longitudinally extended edges 18 that are spaced apart over the length of the front side 12. Likewise, the back side 14 defines a pair of second longitudinally extended edges 17 that are spaced apart over the length of the back side 14. Connection flaps 16 project from the second longitudinally extended edges 17 in a direction generally normal to the back side 14. The connection flaps 16 serve to offset, space, or retain at a distance A, the first longitudinally extended edges 18, by attachment thereto, from the back side 14. The distance A is at least about 3 mm, and preferably in the range from about 6 mm to about 25 mm, depending on the dimensions of the scallop and desired rigidity of the front side. This rigidity characteristic relates to the particular service or process for which the conduit or scallop 10 is intended.

According to the design of the present invention, a pair of connection flaps 16 join the front 12 and the back 14 sections, providing flexibility that allows the scallop 10 to deform when subjected to radially directed stresses without damage. More specifically, the connection flaps 16 prevent a direct connection of the normally rigidly designed front side 12 to the conduit back side 14. The offset distance A thus provided ensures a flexible transition to effectively reduce radial stresses that force the front side 12 against the vessel wall. In this manner, the connection flaps allow the conduit 10 to tolerate such stresses without damage. The front side 12 comprises profile wires 13 defining uniformly spaced perforations 20 to separate gaseous feed in the conduit interior from solid catalyst particles. The profile wire front side 12, is made rigid using support bars 15 which affix individual wires in the required uniform manner.

The profile wires 13 and support bars 15 thus form a type of profile wire screen that is understood in the art to be particularly suited for segregating catalyst from feed and product streams in heterogeneous catalytic reaction, adsorption, or treatment operations. Effective separation of the catalyst occurs when the perforation size, or distance separating adjacent profile wires, is kept small enough to prevent migration of the particles into the interior of the conduits 10. The profile wire screen is furthermore designed to be resistant to catalyst particle plugging, since the perforation size is a minimum at the profile wire 13 and catalyst interface and increases in the direction of the conduit interior.

With proper spacing and thickness, the profile wire support bars 15 can provide conduit structural qualities that allow the necessary radial flexibility associated with the processing conditions to which the conduit is subjected. Preferably, the support bars 15 are uniformly spaced at a distance from about 0.1% to about 10% of the length of the longitudinally extended edges 18 of the front side 12. Also, the support bars 15 normally have a rectangular cross section (although essentially any cross sectional shape is possible) with a diagonal length from about 0.5 to about 2 times the thickness of the profile wire, as measured in the transverse direction. It is possible for the support bars 15 to affix the profile wires 13 on the outer surface of the front side 12. However, in the interest of providing a smooth surface against which solid catalyst particles can be retained, it is generally preferred that the transversely extending support bars 15 are attached to the inner surface of the front side 12. In this configuration, the support bars 15 are located within the interior of the scallop 10.

The opposite edges 18 of the front side 12 of the conduit 10 are joined to the connection flaps 16 using any suitable means known in the art, preferably welding. Although FIG. 2 shows an attachment of the front side edges 12 to the outer surface of the connection flaps 16, this depiction is not meant to limit the design. Therefore, it is certainly also within the scope of the present invention to join the front side edges 12 to the inner surface of the connection flaps 16. The connection flaps 16 connect to the back side 14, preferably in continuous transitions through two small radius knuckle sections or edges 17 having a radius $R_3$. In a scallop conduit configuration, $R_3$ is much smaller than either $R_1$ or $R_2$.

The geometries of scallops and the containment vessel in which they are normally used have typically produced a relatively tight clearance between the backs of the scallops and the vessel wall. In almost all such arrangements the backs of the scallops are less than 5 centimeters from the vessel wall and usually less than 3 centimeters from the vessel wall. To maintain such tolerances, it is preferred that the back side transverse radius of curvature $R_2$ of the scallop is at least about two thirds of the radius of the vessel.

It is normal practice in fluid-solid contacting devices to perforate at least the front sides of the scallops. In the scallop design of the present invention, it is generally not necessary to perforate the back side. However, as taught in U.S. Pat. No. 5,366,704, hereby incorporated by reference, some advantages can be gained in perforating the backs of the scallops as well. Such advantages include the reduction or elimination of areas of reduced flow, the abatement of temperature gradients or fluctuations, and an improvement in the uniformity of fluid/particle contacting. It is within the scope of the present invention to perforate the back sides of the scallops in accordance with methods known in the art, such as punched plate formation when the back sides comprise, for example, a metal sheet. Perforations, however, normally do not extend into connection flaps of the conduit. As mentioned previously, the connection flaps are designed to absorb high stresses, and therefore structural considerations usually dictate the absence of perforations from the connection flaps.

The arrangement and modification of the distribution/collection conduits and the resulting advantages in the collection or distribution of fluids can be more readily appreciated from and will be further described in the context of an apparatus and process for reforming hydrocarbons. The description of this invention, in the limited context of a specific apparatus and process, is not meant to restrict the broad application of this invention to any specific apparatus or process for fluid solid contacting.

The catalytic reforming process is well known in the art. A hydrocarbon feedstock and a hydrogen-rich gas are preheated and charged to a reforming zone containing typically two to five reactors in series. The hydrocarbon feed stream that is charged to a reforming system will comprise naphthenes and paraffins that boil within the gasoline range. The preferred class includes straight-run gasolines, natural gasolines, synthetic gasolines, and the like. As an alternative embodiment, it is frequently advantageous to charge thermally or catalytically cracked gasolines or partially reformed naphthas. Mixtures of straight-run and cracked gasoline-range naphthas can also be used to advantage. The gasoline-range naphtha charge stock may be a full-boiling gasoline having an initial boiling point from about 40° C. to about 70° C. and an end boiling point within the range from about 160° C. to about 220° C., or may be a selected fraction thereof which generally will be a higher-boiling fraction commonly referred to as a heavy naphtha (e.g. a naphtha boiling in the range from about 100° C. to about 200° C.). In some cases, it is also advantageous to charge pure hydrocarbons or mixtures of hydrocarbons (e.g. raffinates from aromatics extraction or straight-chain paraffins) that have been recovered from extraction units and are to be converted to aromatics.

Operating conditions used for reforming processes usually include an absolute pressure selected within the range from about 100 to about 7000 kPa, with the preferred absolute pressure being from about 350 to about 4250 kPa. Particularly good results are obtained at low pressure, namely an absolute pressure from about 350 to about 2500 kPa. Reforming conditions include a temperature in the range from about 315° C. to about 600° C. and preferably from about 425° C. to about 565° C. As is well known to those skilled in the reforming art, the initial selection of the temperature within this broad range is made primarily as a function of the desired octane of the product reformate, considering the characteristics of the charge stock and of the catalyst. Ordinarily, the temperature is thereafter slowly increased to provide a constant octane product during the run and to compensate for the gradual catalyst deactivation. The reforming conditions in the present invention also typically include sufficient hydrogen to provide an amount from about 1 to about 20 moles of hydrogen per mole of hydrocarbon feed entering the reforming zone, with excellent results being obtained when about 2 to about 10 moles of hydrogen are used per mole of hydrocarbon feed likewise, the liquid hourly space velocity (LHSV) used in reforming is selected from the range from about 0.1 to about 10 $hr^{-1}$, with a value in the range from about 1 to about 5 $hr^{-1}$ being preferred.

A multi-functional catalyst composite, which contains a metallic hydrogenation-dehydrogenation component on a porous inorganic oxide support providing acid sites for cracking and isomerization, is usually employed in catalytic reforming. Most reforming catalyst is in the form of spheres or cylinders having an average particle diameter or average cross-sectional diameter from about 1/16" to about 3/16". Catalyst composites comprising platinum on highly purified alumina are particularly well known in the art. Those of ordinary skill in the art are also aware of metallic modifiers, such as rhenium, iridium, tin, and germanium, that improve product yields or catalyst life in platinum-catalyst reforming operations.

The principal reactions that take place are the dehydrogenation of naphthenes to aromatics, dehydrocyclization of paraffins, isomerization of paraffins and naphthenes, hydrocracking of paraffins to light hydrocarbons, and formation of coke, which is deposited on the catalyst. Coke is formed as a by-product of these reactions and deposits on the catalyst thereby causing the catalyst to lose activity gradually over time.

Figure 4:
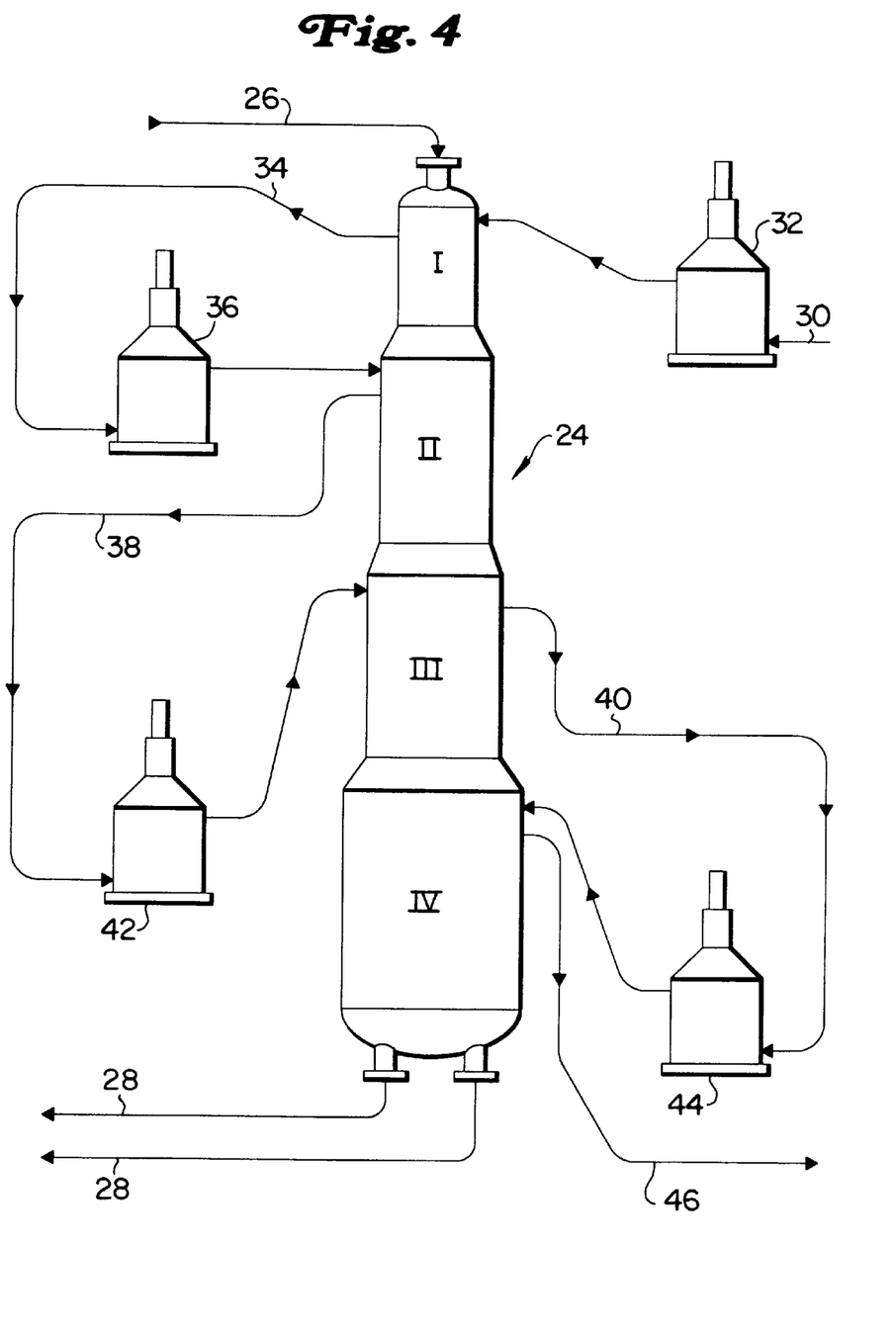
FIG. 4 is a schematic view of a stacked reactor system.

A reforming reaction section provides a good example of a fluid/solid contacting apparatus that often employs scallops for gas distribution. Many reforming sections operate with the continuous addition and withdrawal of catalyst particles through a series of radial flow reactors. FIG. 4 shows such a reaction section for the reforming of hydrocarbons. The reaction section contains a series of four reactors arranged vertically in a stacked reactor vessel 24. The individual reactors or reaction zones are identified by numerals I–IV. Catalyst particles enter the top of the stacked reactor arrangement through catalyst transfer line 26 and pass through the series of four reactors under gravity flow. After passage through each reactor section, the catalyst particles are withdrawn from the bottom of reactor IV by one or more catalyst withdrawal lines 28. Catalyst withdrawn by lines 28 is regenerated by the oxidation and removal of coke deposits in a regeneration zone. After regeneration, catalyst particles are again returned to the process by line 26.

The hydrogen and hydrocarbon feed pass through the four reactors. The feed first enters the process through a line 30 and passes through a heater 32 to raise its temperature before entering reaction zone I. Partially converted feed is collected from the top of reaction zone I by a line 34, passed through an interstage heater 36, and led into reaction zone II. Intermediate reactor lines 38 and 40 carry the partially converted feed through reaction zones III and IV with interstage heaters 42 and 44 supplying heat for the reactions therein. The reformate product is recovered from reaction zone IV by a product line 46.

Figure 5:
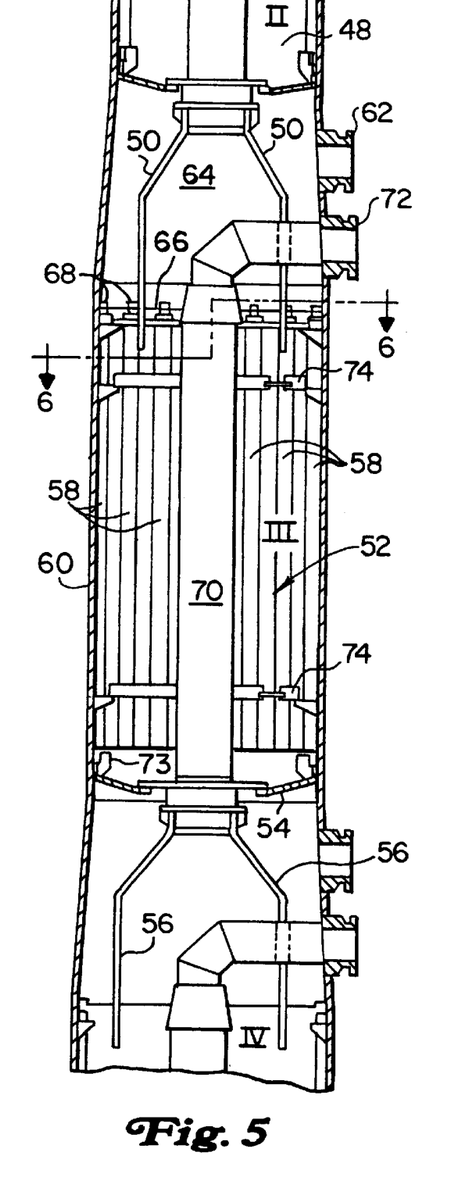
FIG. 5 is a partial sectional view of the reactor of FIG. 4.

As the catalyst passes through adjacent stacked reactors, it is detained in a catalyst bed in each reactor. The arrangement of the internals for forming the catalyst bed and effecting the gas solid contacting is shown in FIG. 5. FIG. 5 shows a sectional view of reaction zone III, but is representative of intermediate reaction zone II as well. Catalyst particles (not shown) are transferred from a particle retaining space 48 by a series of transfer conduits 50 into a particle retaining space 52 in reaction zone III. A bed of catalyst particles is formed in retaining space 52 immediately below the lower extent of transfer conduits 50. An intermediate vessel partition, or head 54 defines the lower extent of retaining space 52 and the catalyst bed. A series of scallops 58 and the wall 60 of stacked reactor 24 define the outer extent of the catalyst bed in retaining space 52. Catalyst particles are withdrawn from the bottom of retaining space through another series of transfer conduits 56 that transfer the particles into reaction zone IV for ultimate removal from the stacked reactor.

The reactant stream enters reaction zone III through a nozzle 62 and flows into a distribution chamber 64. A cover plate 66 extends across the bottom of chamber 64 to separate it from retaining space 52. Chamber 64 communicates the reactants with the interior of the scallops through a series of risers 68 that extend through cover plate 66. The reactants pass across retaining space 52 and are collected by a central conduit 70 that defines the inner boundary of the catalyst bed. Thus, the central conduit 70 and the outer conduits or scallops 58 define the catalyst retaining space 52, which has a generally annular cross section. Conduit 70 has a closed bottom and transports the effluent vapors from retaining space 52 upward and out of the stacked reactor 24 through a nozzle 72.

Means are provided for holding the scallops in place against the wall of the vessel. The means can hold at least a portion of the scallops against the wall or can hold the scallops against supports that offset the scallops slightly from the wall of the vessel. These supports will offset the scallops by less than 5 cm from the vessel wall and more often by less than 3 cm from the vessel wall. In preferred form, a bottom support 73 and an expansion ring 74 hold the scallops in place. Support 73 forms a rigid support for the bottom of the scallop. Although there is usually a provision for a sliding fit between the riser 68 (at the top of the scallop) and cover plate 66, frictional forces can restrict relative movement between the scallops 58 and vessel wall 60. When the reactor vessel is undergoing initial start-up, hot vapors entering the reaction zones first contact the scallops. As a result, the scallops heat up quickly. In contrast, the wall of the vessel receives little, if any, direct vapor contact and is heated much more slowly. This difference in heating rates creates differences in expansion between the reactor and the scallop as previously described. Incorporating perforations in the backs of the scallops, as mentioned previously, may help reduce the differential expansion between the scallops and the vessel wall by effecting a direct flow of hot vapors to the vessel wall.

Figure 6:
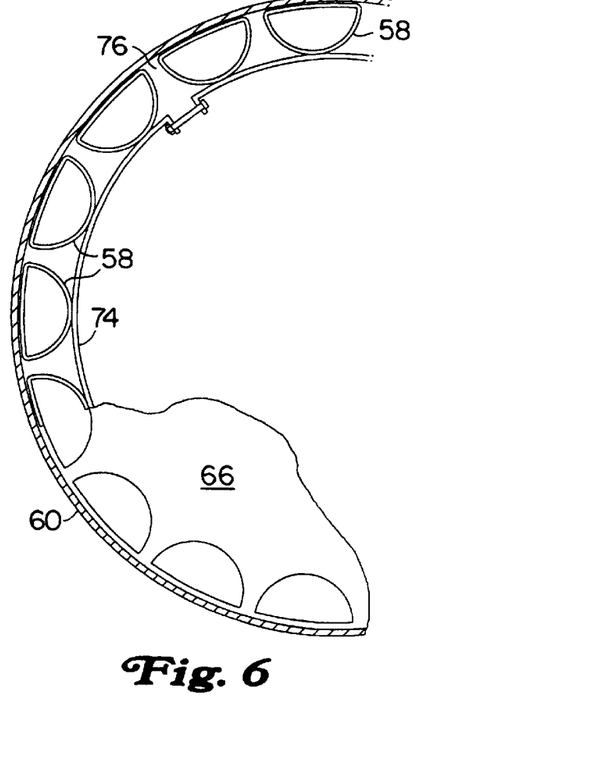
FIG. 6 is a split section of FIG. 5, taken at line 6—6, and showing a plan of a scallop arrangement.

Scallops 58, as further seen in FIG. 6, ring the inside of vessel wall 60. The expansion ring 74 abuts the front side 12 of the scallops and holds the scallops against the vessel wall. The depth of the scallops in FIG. 6 equals the radial distance between the ring and the vessel wall. FIG. 6 also demonstrates how the back sides 14 of the scallops 58 closely match the curvature of the vessel wall 60 so that there is little space between the back of the scallop and the vessel wall. FIG. 6 also depicts the usual spacing 76 that is found between scallops.

In stacked reactor arrangements, and particularly in reforming reactors, it is usually desirable to limit pressure drop across the different stages. Furthermore, in fluid particle contacting in general, it is preferred to avoid excessive pressure drop through fluid distributors. Appreciable pressure drops will form fluid jets that can impinge upon and damage the contacted particles. In order to practice this invention, it is not necessary for the perforations in the conduit profile wire in general to be sized for any positive pressure drop. Accordingly, the practice of this invention will not present pressure drop penalties or particle attrition problems.

The following example further illustrates the advantages and characteristics of the novel scallop-type conduit design of the present invention for use in radial flow devices. This example, while meant to clarify the benefits of the invention, is by no means intended to limit it.

EXAMPLE 1

Scallop-type conduit designs of the prior art, namely the punched plate and conventional profile wire scallops described previously, were compared in mechanical testing to a scallop design of the present invention. Hereinafter in this example, the punched plate scallop, conventional profile wire scallop, and scallop of the present invention are referred to as "Type PPL", "Type CPW", and "Type PRI" scallops, respectively. Scallop characteristics such as size, shape, thickness and type of construction materials, and others considered to materially affect the performance comparison data were identical for the three designs tested. The Type PRI scallop, according to the present invention, comprised a curved front side or section of profile wire connected flexibly via extended connection flaps to a flatter back side. Thus, the profile wire front side of the Type PRI scallop was offset or retained a distance of 12 mm from the back side by welding the front side to the outer surface of the connection flaps. In contrast, there was essentially no offset between the front and back sides of the Type CPW scallop.

Figure 7:
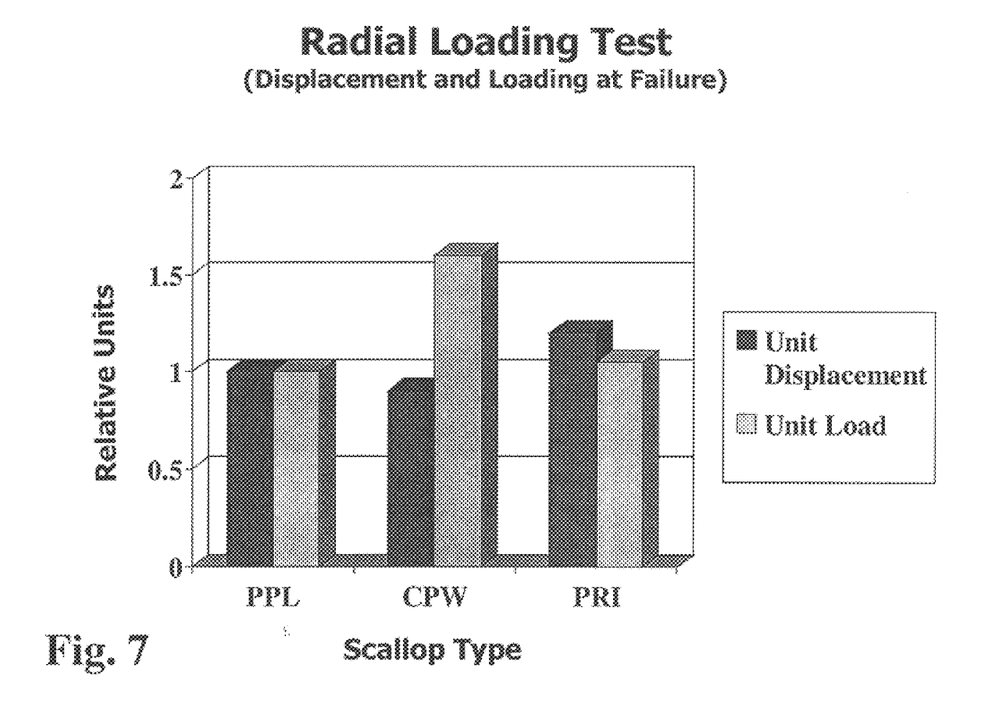
FIG. 7 is a graphical representation of the relative radial stress loading and relative displacement at the point of structural failure for three conduit designs.

Using a hydraulic press and appropriate measuring techniques, both the maximum radial stress loading and maximum radial displacement that each scallop could endure without permanent disfiguration were determined. The graph in FIG. 7 illustrates the average relative values obtained in three trials of mechanical testing.

From the radial displacement measurements, it is apparent that the Type PRI scallop can flex considerably more than the prior art profile wire scallop design (Type CPW) without structural failure. In a typical commercial radial flow reactor operation, therefore, moderate radial stress loadings will be absorbed by the Type PRI scallop and not transferred to other internal structures, such as a reactor centerpipe or central conduit. This characteristic provides a major design advantage over the Type CPW scallop. Furthermore, the ultimate load, or radial stress at which irreparable damage occurs, is lower for the Type PRI scallop compared to the Type CPW scallop. Thus, failure of the scallop is likely to occur, using the Type PRI design, before more costly reactor internals are destroyed from radial stress loadings. Overall, therefore, the behavior of the Type PRI scallop upon exposure to radial stresses closely matches that of the Type PPL (perforated plate) scallop, while the advantage of incorporating an axially rigid profile wire screen is maintained.

Figure 8:
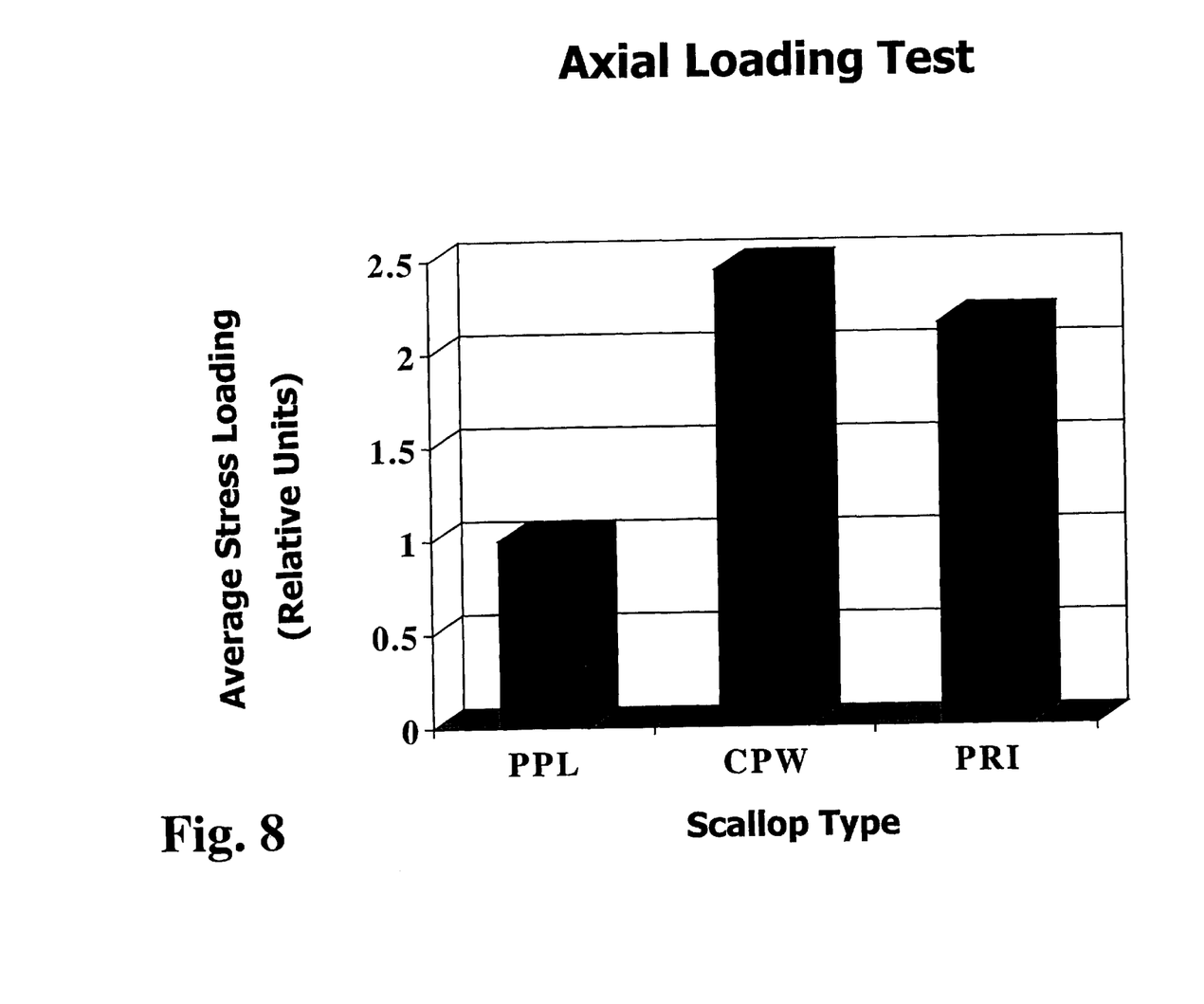
FIG. 8 is a graphical representation of the relative axial stress loading at the point of structural failure for three conduit designs.

The ultimate axial stress loadings for the Type PPL, Type CPW, and Type PRI scallops are compared in the graph in FIG. 8. Again, the data represent the average of three trials for each of these scallop designs, as described in detail previously. Because the scallop design of the present invention, Type PRI, uses a profile wire screen front side, significantly greater axial rigidity than the Type PPL scallop is demonstrated. Thus, the Type PRI scallop has greatly enhanced resistance to buckling under axial stresses compared to that of Type PPL scallops and comparable to that of Type CPW scallop.

What is claimed is:

1. An improved scalloped shaped conduit for contacting particles and fluid in a circumferential arrangement of the conduits about the interior of a vessel, the conduit comprising:
   a) an axially extended front side having a first transverse radius of curvature defined by a plurality of longitudinally extended profile wires generally uniformly spaced about the circumference of the first radius and rigidly retained by a plurality of transversely extending support bars with the profile wires and support bars defining a plurality of perforations over the front side and defining a pair of first longitudinally extended edges that are spaced apart across the width of the front side and extend the length of the front side;
   b) an axially extended back side having a second transverse radius of curvature greater than the first radius and defining a pair of second longitudinally extended edges that are spaced apart across the width of the back side and extend the length of the back side; and
   c) a pair of connection flaps, with each flap projecting in a generally normal direction from one of the second longitudinally extended edges and retaining one of the first longitudinally extended edges to space each first longitudinally extended edge from the back side.

2. The conduit of claim 1 where each first longitudinally extended edge is spaced at least 3 mm from the back side.

3. The conduit of claim 1 where the connection flaps project from the second longitudinally extended edges in a continuous transition through a transition radius smaller than both the first and the second transverse radii.

4. The conduit of claim 1 where the support bars extend through the interior of the conduit.

5. The conduit of claim 1 where the transversely extending support bars are uniformly spaced at a distance from about 0.1% to about 10% of the length of the first longitudinally extended edges.

6. The conduit of claim 1 where the support bars have a rectangular cross section with a diagonal length from about 0.5 to about 2 times the thickness of the profile wire.

7. An improved radial flow device for contacting particles and fluid comprising:
   a) a vertically extending vessel having a fluid inlet and a fluid outlet;
   b) a plurality of vertically extended outer conduits arranged circumferentially about the interior of the vessel, each outer conduit having;
      i) a transverse cross-section, defined by;
         A) a first radius to provide a front side comprising uniformly spaced profile wire extending generally vertically along the front side to define a plurality of perforations, the profile wire rigidly affixed to a plurality of vertically spaced support bars extending generally horizontally across the front side;
         B) a second radius larger than the first radius, the second radius defining a horizontally extended back side located proximate the wall of the vessel; and
         C) a connection flap extending generally toward the interior of the vessel from each of two vertical edges of the back side for flexibly joining, at a location offset from the back side, each of two vertical edges of the front side; and
      ii) at least one end communicating with one of the fluid inlet and fluid outlet;
   c) a perforated central conduit located in the center of the vessel and communicating with the other of the fluid inlet and the fluid outlet that is not communicating with the outer conduits; and
   d) a particle retaining space in the vessel defined by at least one of the vessel, the central conduit, and the outer conduits, the particle retaining space communicating with the plurality of perforations and the central conduit.

8. The device of claim 7 where the back side defines a non-perforated surface.

9. The device of claim 7 where the particle retaining space has a generally annular cross-section defined by the central conduit and the outer conduits.

10. The device of claim 7 where the fluid inlet communicates with the interior of the outer conduits and the central conduit communicates with the fluid outlet to create a radially inward fluid flow path through the particle retaining space.

11. The device of claim 7 where the vessel is cylindrical and the second radius is equal to at least about two thirds of the radius of the vessel.

* * * * *